US012744909B2

(12) United States Patent
Chen et al.

(10) Patent No.: US 12,744,909 B2
(45) Date of Patent: Sep. 22, 2026

(54) VIDEO ENCODING METHOD AND APPARATUS, ELECTRONIC DEVICE AND STORAGE MEDIUM

(71) Applicants: Douyin Vision Co., Ltd., Beijing (CN); Lemon Inc., Grand Cayman (KY)

(72) Inventors: Cheng Chen, Beijing (CN); Shu Shi, Los Angeles, CA (US)

(73) Assignees: DOUYIN VISION CO., LTD., Beijing (CN); LEMON INC., Grand Cayman (KY)

( * ) Notice: Subject to any disclaimer, the term of this patent is extended or adjusted under 35 U.S.C. 154(b) by 6 days.

(21) Appl. No.: 18/913,926

(22) Filed: Oct. 11, 2024

(65) Prior Publication Data

US 2025/0133213 A1 Apr. 24, 2025

(30) Foreign Application Priority Data

Oct. 19, 2023 (CN) ........................ 202311361245.2

(51) Int. Cl.
*H04N 19/136* (2014.01)
*H04N 19/177* (2014.01)

(52) U.S. Cl.
CPC ......... *H04N 19/136* (2014.11); *H04N 19/177* (2014.11)

(58) Field of Classification Search
CPC .. H04N 19/136; H04N 19/177; H04N 19/114; H04N 19/146
USPC .................................................... 375/240.02
See application file for complete search history.

(56) References Cited

U.S. PATENT DOCUMENTS

| | | | | |
|---|---|---|---|---|
| 7,116,715 | B2 * | 10/2006 | Yoneyama | H04N 19/137 375/E7.22 |
| 11,758,146 | B2 * | 9/2023 | Katsavounidis | H04N 21/234363 386/328 |
| 2011/0182365 | A1 * | 7/2011 | Mohsenian | H04N 19/177 375/E7.2 |
| 2020/0329249 | A1 * | 10/2020 | Kudana | H04N 19/176 |
| 2021/0105476 | A1 * | 4/2021 | Zhang | H04N 19/146 |
| 2021/0144386 | A1 * | 5/2021 | Katsavounidis | H04L 65/80 |
| 2021/0224549 | A1 * | 7/2021 | Elgamal | G06N 3/08 |
| 2024/0298001 | A1 * | 9/2024 | Xu | H04N 19/137 |

FOREIGN PATENT DOCUMENTS

| | | | |
|---|---|---|---|
| CN | 1951122 | A | 4/2007 |
| CN | 113132765 | A | 7/2021 |

* cited by examiner

*Primary Examiner* — Christopher S Kelley
*Assistant Examiner* — Ana Picon-Feliciano
(74) *Attorney, Agent, or Firm* — Astute IP Law Group

(57) ABSTRACT

The embodiment of the disclosure provides a video encoding method and apparatus, an electronic device and a storage medium. The method includes the steps of determining a video segment included in a target video according to a duration corresponding to a first picture group parameter; determining a target feature corresponding to video encoding data of a previous video segment for a current video segment; inputting the target feature into a target decision model, and determining a picture group parameter corresponding to the current video segment by using the target decision model; and encoding the current video segment based on the picture group parameter corresponding to the current video segment.

20 Claims, 3 Drawing Sheets

500
501
PROCESSING DEVICE
502
ROM
503
RAM
504
505
I/O INTERFACE
506
INPUT DEVICE
507
OUTPUT DEVICE
508
STORAGE DEVICE
509
COMMUNICATION DEVICE

VIDEO ENCODING METHOD AND APPARATUS, ELECTRONIC DEVICE AND STORAGE MEDIUM

CROSS-REFERENCE

This application claims priority to Chinese Patent Application No. 202311361245.2 filed on Oct. 19, 2023, and entitled “VIDEO ENCODING METHOD AND APPARATUS, ELECTRONIC DEVICE AND STORAGE MEDIUM,” which is hereby incorporated by reference herein in its entirety.

FIELD

Embodiments of the present disclosure relate to data processing technologies, and in particular, to a video encoding method and apparatus, an electronic device, and a storage medium.

BACKGROUND

Video encoding refers to a process of converting a file in a certain video format into a file in another video format through a specific compression technology. During video encoding, a video sequence may be divided into a plurality of groups of pictures (GOP), and then compressed in units of GOP.

A GOP refers to a group of consecutive video pictures consisting of an I frame, a P frame and a B frame. In a GOP, to ensure that a subsequent frame may be decoded and played, a first video frame is the I frame. In a live streaming scenario, since a viewer may join a live streaming room at any time, to ensure that a video frame sent to a client may be normally decoded, a server may deliver the live streaming from an I frame at the start of a current GOP, resulting in additional live streaming delay. To ensure the real-time performance of the live broadcast, a GOP parameter in the live broadcast scene may not be set too large, resulting in a decrease in video encoding compression rate, thereby increasing a video code rate.

SUMMARY

The disclosure provides a video encoding method and apparatus, an electronic device and a storage medium, and may solve the problems of video compression rate and video code rate caused by improper GOP parameter setting.

In a first aspect, an embodiment of the present disclosure provides a video encoding method, including:

- determining a video segment included in a target video according to a duration corresponding to a first picture group parameter;
- determining a target feature corresponding to video encoding data of a previous video segment for a current video segment;
- inputting the target feature into a target decision model, and determining a picture group parameter corresponding to the current video segment by using the target decision model, where the target decision model represents a decision model associated with a picture group parameter corresponding to the previous video segment in at least two decision models, and the at least two decision models are trained based on a sample set generated by encoding a historical video based on at least two picture group parameters; and

- encoding the current video segment based on the picture group parameter corresponding to the current video segment.

In a second aspect, an embodiment of the present disclosure further provides a video encoding apparatus, including:

- a video determining module, configured to determine a video segment included in the target video according to a duration corresponding to the first picture group parameter;
- a feature determining module, configured to determine a target feature corresponding to the video encoding data of the previous video segment of the current video segment;
- a parameter decision module, configured to input the target feature into a target decision model, and determine, by using the target decision model, a picture group parameter corresponding to the current video segment, where the target decision model represents a decision model associated with a picture group parameter corresponding to the previous video segment in at least two decision model, and the at least two decision model are trained based on a sample set generated by encoding historical video based on at least two picture group parameters; and
- a video encoder module, configured to encode the current video segment based on a picture group parameter corresponding to the current video segment.

In a third aspect, an embodiment of the present disclosure further provides an electronic device, including:

- one or more processors; and
- a storage device, configured to store one or more programs;
- the one or more programs, when executed by the one or more processors, cause the one or more processors to implement the method of any embodiments of the present disclosure.

In a fourth aspect, an embodiment of the present disclosure further provides a storage medium including computer-executable instructions, where the computer-executable instructions, when executed by a computer processor, are configured to perform the method of any embodiment of the present disclosure.

BRIEF DESCRIPTION OF DRAWINGS

The above and other features, effects, and aspects of various embodiments of the present disclosure will become more apparent from the following detailed description taken in conjunction with the accompanying drawings. Throughout the drawings, the same or similar reference signs refer to the same or similar elements. It should be understood that the drawings are schematic, and elements and components are not necessarily drawn to scale.

DETAILED DESCRIPTION

Figure 1:
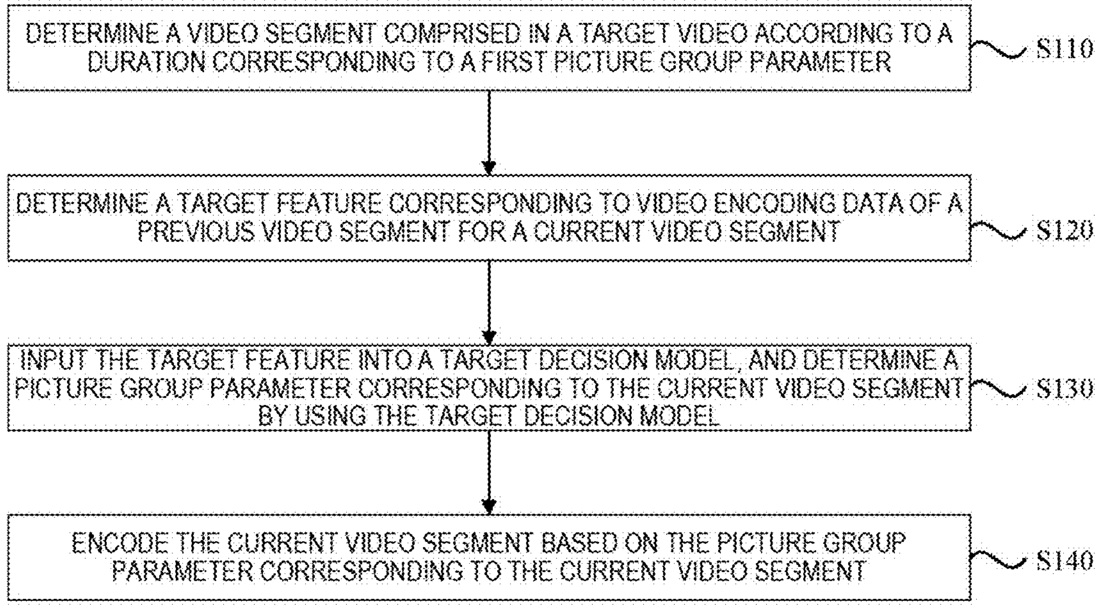
FIG. 1 is a schematic flowchart of a video encoding method according to an embodiment of the present disclosure.

Embodiments of the present disclosure will be described in more detail below with reference to the accompanying drawings. While certain embodiments of the present disclosure are shown in the drawings, it is to be understood that the present disclosure may be implemented in various forms, and should not be construed as limited to the embodiments set forth herein, and vice versa. It should be understood that the drawings and embodiments of the present disclosure are for exemplary purposes only and are not intended to limit the scope of the present disclosure.

It should be understood that the steps recited in the method embodiments of the present disclosure may be performed in different orders, and/or in parallel. Further, the method embodiments may include additional steps and/or omit performing the illustrated steps. The scope of the present disclosure is not limited in this respect.

As used herein, the term "including" and deformation thereof are open-ended, i.e., "including but not limited to". The term "based on" is "based at least in part on". The term "an embodiment" means "at least one embodiment";

the term "another embodiment" means "at least one further embodiment"; the term "some embodiments" means "at least some embodiments". The relevant definition of other terms will be given below.

It should be noted that concepts such as "first" and "second" mentioned in the present disclosure are merely used to distinguish different apparatuses, modules, or units, and are not intended to limit the order of functions performed by the apparatuses, modules, or units or the mutual dependency relationship.

It should be noted that the modification of "a" and "a plurality of" mentioned in the present disclosure is illustrative and not limiting, and those skilled in the art should understand that "one or more" should be understood unless the context clearly indicates otherwise.

The names of messages or information interaction between a plurality of devices in embodiments of the present disclosure are for illustrative purposes only and are not intended to limit the scope of such messages or information.

It may be understood that the data involved in the technical solution (including but not limited to the data itself, the acquisition or use of the data) should follow the requirements of the corresponding laws and regulations and related restrictions.

For ease of understanding, technical terms that may occur in the present disclosure are explained below.

In video encoding, video frames are usually divided into three types: I, P, and B.

An intra coded picture (I frame) is an independent frame with all information, and may be decoded without referring to other pictures, which may be simply understood as a static picture.

A predictive coded picture (P frame) is an inter-frame predictive encoding frame, and needs to be encoded by referring to the previous I frame, which represents differences between the current frame picture and the previous reference frame (the number of reference frame ≥1). When decoding, a difference defined in the current frame needs to be superimposed with a previously buffered picture to generate a final picture. Compared with the I frame, the data amount of P frame is smaller.

The bidirectionally predictive coded picture (B frame) is bidirectional predictive coding frame, that is, B frame records differences between the current frame and the previous and latter frames. To decode the B-frame, not only the previously cached picture needs to be obtained, but also the latter picture needs to be decoded, and the final picture is obtained through superposition of the previous and latter pictures and the frame data of the current frame. The data amount of B frame is minimal, but the decoding performance requirement is high.

Peak signal-to-noise ratio (PSNR) is one of indicators commonly used in video quality evaluation, which is an error based evaluation method for measuring the difference between an original image and a compressed or other processed image. The larger the numerical value is, the smaller the difference between the two images is, and the higher the image quality is. Bjontegaard delta rate (bd-rate, rate distortion) is typically used in video encoding to evaluate the performance of two sets of encoders or coding parameters, which reflects the percent rate change of both encoder at the same image quality.

In a live streaming scenario, the GOP of the playing stream may be increased to reduce the video bit rate, however, increasing the GOP does not necessarily result in bd-rate gain, for some videos with severe motion, increasing the GOP may decrease the video bit rate, but due to error accumulation of inter-frame prediction, the image quality of the video also decreases, resulting in a bd-rate greater than 0, that is, the video code rate required at the same image quality is higher. Therefore, the fixed GOP size cannot ensure that there are bd-rate gains on all videos, and an adaptive decision algorithm is needed to dynamically decide the GOP parameters in the encoding process.

An adaptive GOP parameter decision scheme usually uses information in an encoding process to detect whether a video content scene switching occurs in a current frame, and inserts an I frame at a frame position with a significant change in picture content as a new GOP start position. The detection method generally includes inter-frame prediction and intra-frame prediction information in the encoder, or fast encoding low resolution version of the video picture to make an auxiliary decision.

The adaptive GOP decision mode in the related art has the following problems when applied in the live streaming scenario:

first, switching of video pictures in a live streaming scenario is not frequent, and therefore, a decision algorithm being started on a frame-by-frame basis to detect whether there is a significant change in picture content will introduce additional resource overheads.

second, some scene switching detection algorithms need to additionally encode some video pictures to obtain decision information during a decision, for example, fast encoding low resolution version of the video picture; in addition, some scene switching detection algorithms need to use pictures of a video after the current picture to perform auxiliary decision. Such schemes introduce additional coding delay and resource overhead in live streaming scenarios.

third, some adaptive GOP decision algorithms decides based on an empirically set threshold, and compared with a machine learning based method, characteristics of different data sets may not be adapted, and generalization ability is poor.

Embodiments of the present disclosure provide a solution for dynamically determining a GOP parameter of a current video segment by using a decision model using a feature corresponding to the video encoding data of a previous video segment, to resolve a problem in an adaptive GOP decision matcher in the related art.

The embodiment of the present disclosure provides a video encoding method and apparatus, an electronic device and a storage medium, where the target feature of the video encoding data of the previous video segment for the current video segment is obtained, the target feature is input into the target decision model, the picture group parameter adopted by the current video segment coding is dynamically determined through the target decision model, then the current video segment is coded through the determined picture group parameter, and the problems of video compression rate and video code rate caused by adopting a fixed GOP coded video sequence in the live broadcast scene are solved. According to the embodiment of the disclosure, the picture group parameters are dynamically determined for each video segment, extra coding delay and resource overhead are not introduced, and the condition of code rate waste or picture quality loss caused by non-adaptation of video features and picture group parameters may be effectively reduced.

FIG. 1 is a schematic flowchart of a video encoding method according to an embodiment of the present disclosure.

As shown in FIG. 1, the method includes the following steps.

S110, determine a video segment included in a target video according to a duration corresponding to a first picture group parameter.

The picture group parameter represents a time length between two adjacent I frames. During video encoding, the picture group parameter affects the code rate of a coded video, when the picture group parameter is increased, the number of I Frames in the video is correspondingly reduced, the video encoding compression rate is improved, and the code rate of the coded video is correspondingly reduced.

In an embodiment of the present disclosure, the first picture group parameter is a picture group parameter that meets a set condition in at least two picture group parameters. For example, the picture group parameter with a largest duration in the at least two picture group parameters is used as the first picture group parameter. It should be noted that the set condition is not limited to a maximum duration, and the set condition may be defined by the application requirement.

The target video may be a to-be-compressed live stream. In a live streaming scenario, a server compresses a live stream in units of GOP.

For example, a duration corresponding to the first picture group parameter is the video duration, and the target video is divided into a plurality of video segments corresponding to the plurality of video durations. For example, if the first picture group parameter is x seconds, the target video corresponding to each live video stream is divided into a plurality of video segments of x seconds.

S120, determine a target feature corresponding to video encoding data of a previous video segment for a current video segment.

The video encoding data represent encoding data obtained by encoding the video segment based on a picture group parameter corresponding to the video segment. The target feature may include a frame size of the encoding data of the encoded video and PSNR information of a set frame. Feature extraction policies are respectively set for different picture group parameters, so that different target features in the video encoding data are obtained by adopting a feature extraction policy.

The feature extraction policy represents a feature construction mode corresponding to different picture group parameters, and different picture group parameters correspond to different feature construction modes. For example, different feature construction manners correspond to different feature fields. It should be noted that, the feature extraction policy may be set based on actual application, and the feature extraction policy is associated with the picture group parameter, so that in the encoding process of the video segment, the target feature is obtained based on the feature extraction policy as the input feature of the decision model.

In the embodiment of the present disclosure, if the current video segment is located after the first video segment, the feature extraction policy associated with the picture group parameter corresponding to the previous video segment is obtained, and the obtained feature extraction policy is used to obtain the target feature based on the video segment encoding data corresponding to the previous video segment. The sequence of the video segments may be determined based on the timestamps corresponding to the video segments.

Starting from the second video segment, based on a feature field included in the feature extraction policy associated with the picture group parameter of the previous video segment, the target feature corresponding to the feature field is determined based on the video segment encoding data of the previous video segment. The target feature is content information corresponding to the feature field.

For example, for the second video segment and the video segments appearing after the second video segment, in the encoding process of the previous video segment, the feature extraction policy is matched based on the picture group parameter used for encoding the previous video segment, and then the target feature is obtained based on the video encoding data corresponding to the previous video segment based on the feature extraction policy.

In some embodiments, for a first video segment of the target video, the first video segment is encoded based on a second picture group parameter to obtain a first video segment encoding data, where a duration corresponding to the second picture group parameter is less than a duration corresponding to other picture group parameters.

Since the first video segment does not have a previous video segment, the first video segment is encoded by a fixed picture group parameter. To ensure the real-time performance of the live broadcast, the first video segment is encoded by the second picture group parameter with the shortest duration in the at least two picture group parameters, to obtain the first video segment encoding data.

S130, input the target feature into a target decision model, and determine a picture group parameter corresponding to the current video segment by using the target decision model.

The target decision model represents a decision model associated with a picture group parameter corresponding to the previous video segment in at least two decision models, and the at least two decision models are trained based on a sample set generated by encoding historical videos based on at least two picture group parameters.

For example, the target feature is input into a target decision model associated with a picture group parameter corresponding to the previous video segment, and a picture group parameter corresponding to the current video segment is selected from at least two picture group parameters based on an output result of the target decision model.

Since the sample set of the decision model is trained based on the sample set generated by encoding the historical video based on the picture group parameter, that is, there is a relationship that the first picture group parameter corresponds to the first decision model, the second picture group parameter corresponds to the second decision model, and an M-th picture group parameter corresponds to an M-th decision model.

In the embodiments of the present disclosure, the target decision model is determined according to the picture group parameter used for encoding the previous video segment, the target feature is input into the target decision model, the encoding effect of the current video segment is prediction based on the target feature through the target decision model, and one picture group parameter with the best encoding effect is selected from the at least two picture group parameters as the picture group parameter corresponding to the current video segment.

Taking setting two picture group parameters and correspondingly training two decision models for example, the duration corresponding to the first picture group parameter is longer than the duration corresponding to the second picture group parameter, the first decision model corresponds to the first picture group parameter, the second decision model corresponds to the second picture group parameter, and the adaptive picture group parameter decision is performed on each video stream in the following manner during online live broadcast encoding.

For e video segment (that is, the first video segment) corresponding to the duration of an initial first picture group parameter in each video stream, the initial video segment is encoded based on the second picture group parameter, to obtain the first video segment encoding data. During the encoding process, feature construction is performed on the first video segment encoding data based on the feature field corresponding to the feature extraction policy associated with the second picture group parameter to obtain the target feature.

Inputting the target feature corresponding to the first video segment into the second decision model to perform adaptive decision on the picture group parameter used for encoding the second video segment based on the output result of the model. If the output result indicates that the encoding effect of the first picture group parameter is worse than the encoding effect of the second picture group parameter, the second video segment is encoded by the second picture group parameter, otherwise, if the model output result indicates that the encoding effect of the first picture group parameter is better than the encoding effect of the second picture group parameter, the second video segment is encoded by the first picture group parameter.

From the second video segment, the target feature is determined based on the video segment encoding data corresponding to the previous video segment in real time based on the feature extraction policy associated with the picture group parameter of the previous video segment. The corresponding decision model is selected based on the picture group parameter of the previous video segment to decide the picture group configuration parameter of the current video segment, and the above process is cyclically executed until the live broadcast encoding ends.

S140: encode the current video segment based on the picture group parameter corresponding to the current video segment.

For example, distribution of the picture group in the current video segment is determined based on the picture group parameter corresponding to the current video segment, and the current video segment is encoded with the picture group as the coding unit. Compared with the coding method of the fixed picture group parameter configuration, the coding method based on the dynamic decision picture group parameter of the embodiment of the present disclosure may effectively reduce the code rate waste or the picture loss caused by the mismatch between the video feature and the picture group parameter.

According to the embodiment of the disclosure, the video picture does not need to be detected and additionally coded frame by frame, meanwhile, only historical video data are used, extra coding delay and resource overhead are not introduced, and the video coded by the picture group parameter obtained through the adaptive decision algorithm, compared with the video coded by the fixed picture group parameter, has bd-rate gain.

According to the technical solution of the embodiment of the present disclosure, the target feature of the video encoding data of the previous video segment for the current video segment is obtained, the target feature is input into the target decision model, the picture group parameter adopted by the current video segment coding is dynamically determined through the target decision model, then the current video segment is coded through the determined picture group parameter, and the problems of video compression rate and video code rate caused by adopting a fixed GOP coded video sequence in the live broadcast scene are solved. According to the embodiment of the disclosure, the picture group parameters are dynamically determined for each video segment, extra coding delay and resource overhead are not introduced, and the condition of code rate waste or picture quality loss caused by non-adaptation of video features and picture group parameters may be effectively reduced.

Figure 2:
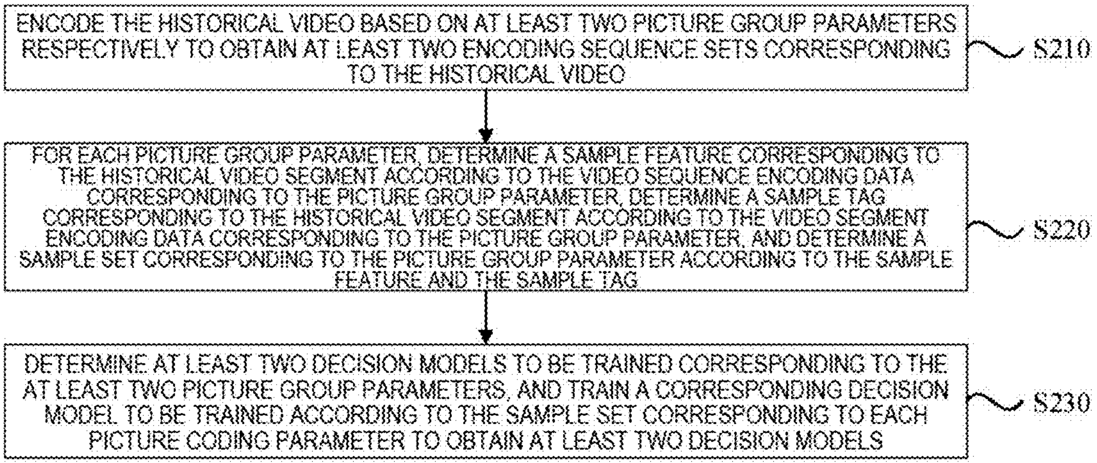
FIG. 2 is a schematic flowchart of another video encoding method according to an embodiment of the present disclosure.

FIG. 2 is a schematic flowchart of another video encoding method according to an embodiment of the present disclosure. As shown in FIG. 2, the method includes the following steps.

S210, encode the historical video based on at least two picture group parameters respectively to obtain at least two encoding sequence sets corresponding to the historical video.

The coding sequence set includes video sequence encoding data and video segment encoding data. For example, the video sequence encoding data are a sequence code obtained by respectively encoding each historical video by using at least two picture group parameters. For each historical video segment included in each historical video, the video segment encoding data are a video segment encoded by respectively encoding the historical video segment by using at least two picture group parameters. The historical video segment may be a video segment obtained by segmenting the historical video based on the picture group parameter with the largest duration in the at least two picture group parameters. In the embodiments of the present disclosure, the duration corresponding to the first picture group parameter is greater than the duration corresponding to other picture group parameters, and therefore, each historical video may be segmented based on the duration corresponding to the first picture group parameter, to obtain the historical video segment included in each historical video.

For example, for each historical video, the historical video is respectively encoded based on at least two picture group parameters, to obtain at least two video sequence encoding data.

Taking an example of setting two image group parameters, where the duration corresponding to the first image group parameter is greater than the duration corresponding to the second image group parameter. For each historical video, the historical video is encoded based on the first picture group parameter and the second picture group parameter to obtain the video sequence encoding data V1 and the video sequence encoding data V2.

The first picture group parameter is determined based on duration corresponding to the at least two picture group parameters, and the historical video is segmented based on duration corresponding to the first picture group parameter to obtain a target data set, where the target data set includes a historical video segment.

For example, a first picture group parameter with a largest duration is selected from at least two picture group parameters, with a duration corresponding to the first picture group parameter as a segmentation duration, each historical video is segmented to obtain a historical video segment corresponding to each historical video, and a set of historical video segments is used as a target data set.

For each historical video segment in the target data set, the historical video segment is encoded based on at least two picture group parameters to obtain at least two video segment encoding data corresponding to the historical video segment.

Taking an example of setting two picture group parameters, for each historical video segment, the historical video segment is encoded based on the first picture group parameter and the second picture group parameter to obtain the video segment encoding data S1 and the video segment encoding data S2.

S220, for each picture group parameter, determine a sample feature corresponding to the historical video segment according to the video sequence encoding data corresponding to the picture group parameter, determine a sample tag corresponding to the historical video segment according to the video segment encoding data corresponding to the picture group parameter, and determine a sample set corresponding to the picture group parameter according to the sample feature and the sample tag.

The sample feature may be a feature corresponding to the feature extraction policy in the encoding data of the historical video segment. For each historical video segment, different feature extraction policies may be used to determine sample features corresponding to the historical video segments based on video segment encoding data encoded by using different picture group parameters. The sample label may represent an encoding effect of at least two picture group parameters for each historical video segment. For each historical video segment, bd-rate may be calculated based on at least two video segment encoding data, the coding effect of each picture group parameter for the historical video segment is represented by bd-rate, and the sample label corresponding to the historical video segment is determined based on bd-rate.

In some embodiments, determining the sample tag corresponding to the historical video segment according to the video segment encoding data corresponding to the picture group parameter includes: determining an encoding effect corresponding to each picture group parameter according to the at least two sets of video segment encoding data corresponding to each historical video segment. The sample label corresponding to the historical video segment is determined according to the encoding effect corresponding to each picture group parameter.

The encoding effect corresponding to each picture group parameter may be determined by using the bd-rate of the video segment encoding data corresponding to each picture group parameter relative to other picture group parameters.

Taking the example of setting two picture group parameters, where the duration corresponding to the first picture group parameter is greater than the duration corresponding to the second picture group parameter. For example, the encoding effect corresponding to the first picture group parameter may be determined by using the bd-rate of the video segment encoding data S1 corresponding to the first picture group parameter relative to the video segment encoding data S2 corresponding to the second picture group parameter. Similarly, the encoding effect corresponding to the second picture group parameter may be determined by using the bd-rate of the video segment encoding data S2 corresponding to the second picture group parameter relative to the video segment encoding data S1 corresponding to the first picture group parameter. The historical video segment with bd-rate >0 relative to S2 is marked as a positive sample, indicating that the encoding effect of the first picture group parameter is worse than the encoding effect of the second picture group parameter. For the historical video segment with bd-rate ≤0 of S1 relative to S2, it is marked as a negative sample, indicating that the encoding effect of the first picture group parameter is not worse than the encoding effect of the parameter of the second picture group.

In some embodiments, determining the sample feature corresponding to the historical video segment according to the video sequence encoding data corresponding to the picture group parameter includes: obtaining a feature extraction policy associated with the picture group parameter, and obtaining, by using the feature extraction policy, the encoding feature corresponding to the current historical video segment based on the video sequence encoding data, as the sample feature of the next historical video segment.

Taking the example of setting two picture group parameters, where the duration corresponding to the first picture group parameter is greater than the duration corresponding to the second picture group parameter. For each historical video, the first picture group parameter corresponds to the video sequence encoding data V1, and the second picture group parameter corresponds to the video sequence encoding data V2. V1 and V2 are respectively segmented according to the first picture group parameter to obtain a plurality of historical video segments in V1 and a plurality of historical video segments in V2, respectively. The historical video segment is a video segment whose duration is a video duration in the video sequence encoding data with a duration corresponding to the first picture group parameter. For the (N−1)-th historical video segment in V1, the feature extraction policy associated with the first picture group parameter determines the target feature based on the historical video segment as the sample feature corresponding to the N-th historical video segment in V1. For the (N−1)-th historical video segment in V2, the feature extraction policy associated with the second picture group parameter determines the target feature based on the historical video segment as the sample feature corresponding to the Nth historical video segment in V2.

For each historical video segment, a supervision training set is generated based on the sample feature and the sample label corresponding to each picture group parameter as a sample set. For example, a first supervision training set is generated based on a sample feature corresponding to each historical video segment in V1 encoded by the first picture group parameter and a sample label corresponding to the historical video segment. A second supervision training set is generated based on a sample feature corresponding to each historical video segment in V2 encoded by the second picture group parameter and a sample label corresponding to the historical video segment.

S230, determine at least two decision models to be trained corresponding to the at least two picture group parameters, and training a corresponding decision model to be trained according to the sample set corresponding to each picture coding parameter to obtain at least two decision models.

The decision model is a classification model constructed based on a machine learning algorithm, and at least two decision model are supervised to perform picture group parameter decision. At least two decision models are trained based on the sample set. For example, the sample set includes a first supervision training set and a second supervision training set, the first decision model is trained by using the first supervision training set, and the second decision model is trained by using the second supervision training set.

The classification model may be selected according to data set characteristics and deployment conditions, including a logistic regression model, a decision tree model, a support vector machine model, and a neural network model.

Figure 3:
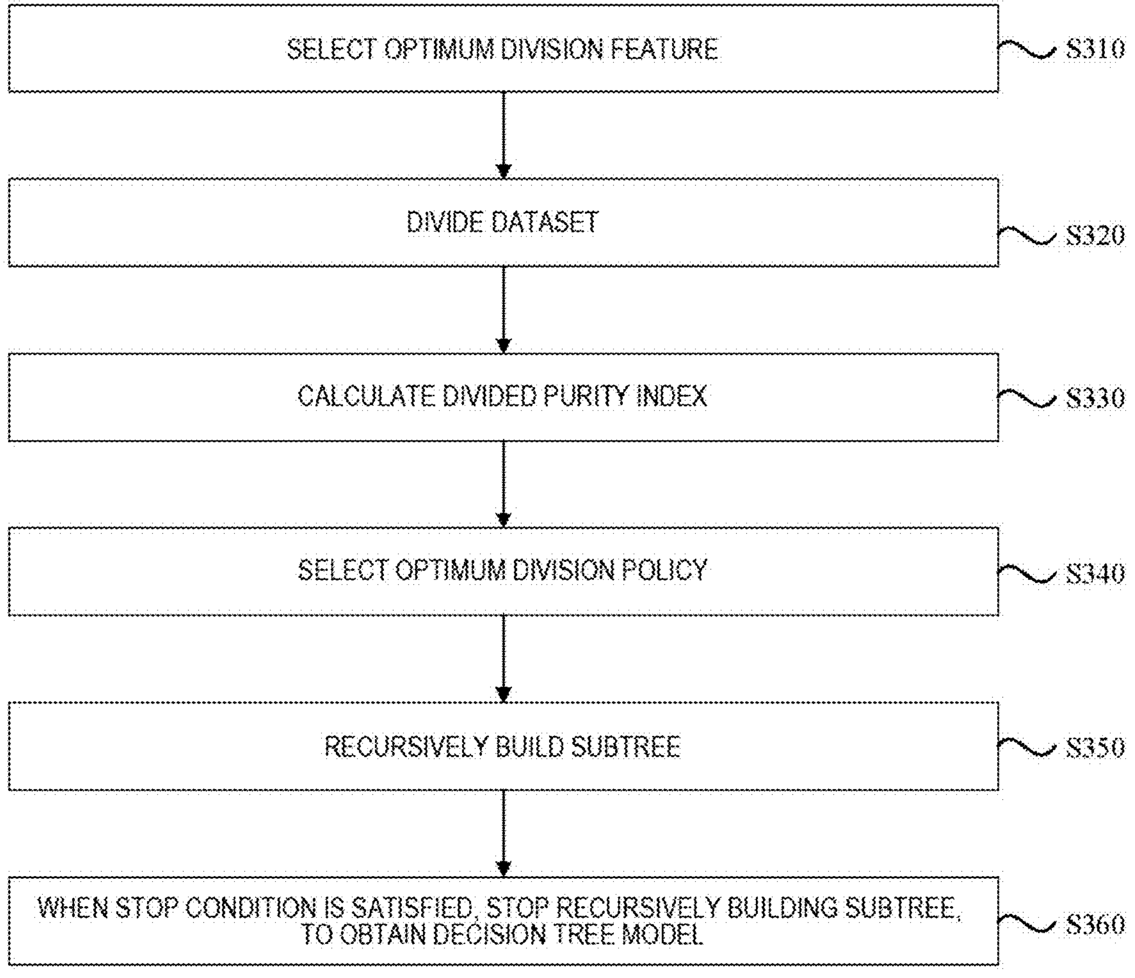
FIG. 3 is a flowchart of a decision tree model training method according to an embodiment of the present disclosure.

The training method is described by taking the training process of the decision tree model as an example. FIG. 3 is a flowchart of a decision tree model training method according to an embodiment of the present disclosure. As shown in FIG. 3, the method includes the following steps.

S310, select an optimal division feature.

For example, the optimal partitioning feature is selected based on the first supervision training set and the second supervision training set, respectively, using a feature selection algorithm.

The feature selection algorithm includes an information gain or Gini Impurity.

S320, divide a data set.

For example, based on the selected division feature and a threshold, the first supervision training set is divided into two subsets, and the second supervision training set is divided into two subsets. The discrete features are divided based on the feature values. For consecutive features, a threshold is selected to divide it into two subsets.

S330, calculate a purity index after division.

The purity index includes the Gini Impurity or entropy.

Exemplarily, the subset division result is evaluated by calculating the purity indexes of the divided subsets.

S340, select an optimal division strategy.

Exemplarily, the division strategy is selected such that the purity of the divided purity is increased or the purity is not reduced.

S350, recursively construct a subtree.

Exemplarily, S310-S340 are repeatedly performed for each subset, and the subtree is recursively constructed until a stop condition is satisfied.

The stopping condition may be that a predetermined depth is reached, a quantity of samples is less than a threshold, or samples in a subset belong to a same category.

S360, stop recursively constructing a subtree to obtain a decision tree model when the stopping condition is satisfied.

The first decision tree model and the second decision tree model are respectively trained by using the first supervision training set and the second supervision training set.

According to the technical solution of the embodiment of the disclosure, at least two decision models are trained with supervision based on at least two supervision training sets constructed offline by utilizing a machine learning algorithm, corresponding to at least two picture group parameters, the characteristics of different data sets may be adapted, and the generalization ability is improved.

Figures 4, 5:
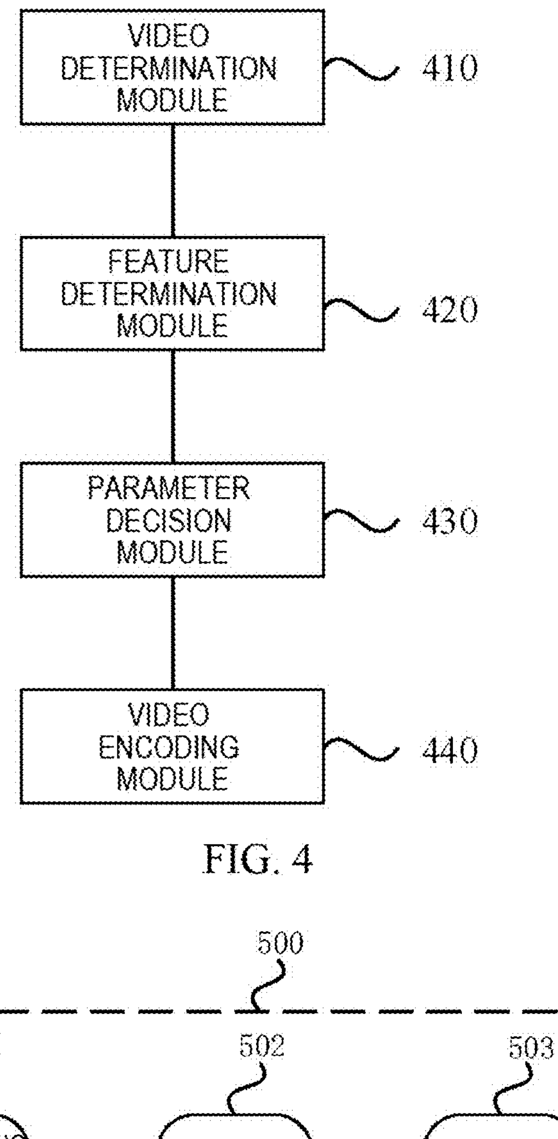
FIG. 4 is a schematic structural diagram of an apparatus for video encoding according to an embodiment of the present disclosure.
FIG. 5 is a schematic structural diagram of an electronic device according to an embodiment of the present disclosure.

FIG. 4 is a schematic structural diagram of an apparatus for video encoding according to an embodiment of the present disclosure. The apparatus may be implemented in a form of software and/or hardware, optionally, implemented by an electronic device, and the electronic device may be a PC terminal or a server.

As shown in FIG. 4, the apparatus includes a video determining module 410, a feature determining module 420, a parameter decision module 430, and a video encoder module 440.

The video determining module 410 is configured to determine a target feature corresponding to the video encoding data of the previous video segment of the current video segment.

The feature determining module 420 is configured to determine a target feature corresponding to the video encoding data of the previous video segment of the current video segment.

The parameter decision module 430 is configured to input the target feature into a target decision model, and determine, by using the target decision model, a picture group parameter corresponding to the current video segment, where the target decision model represents a decision model associated with a picture group parameter corresponding to the previous video segment in at least two decision model, and the at least two decision model are trained based on a sample set generated by encoding historical video based on at least two picture group parameters;

The video encoding module 440 is configured to encode the current video segment based on a picture group parameter corresponding to the current video segment.

According to the technical scheme provided by the embodiment of the disclosure, the target feature of the video encoding data of the previous video segment for the current video segment is obtained, the target feature is input into the target decision model, the picture group parameter adopted by the current video segment coding is dynamically determined through the target decision model, then the current video segment is coded through the determined picture group parameter, and the problems of video compression rate and video code rate caused by adopting a fixed GOP coded video sequence in the live broadcast scene are solved. According to the embodiment of the disclosure, the picture group parameters are dynamically determined for each video segment, extra coding delay and resource overhead are not introduced, and the condition of code rate waste or picture quality loss caused by non-adaptation of video features and picture group parameters may be effectively reduced.

Optionally, the apparatus further includes:

an encoding module, configured to: after determining the video segment included in the target video according to the duration corresponding to the first picture group parameter, for a first video segment of the target video, encoding the first video segment based on a second picture group parameter to obtain first video segment encoding data, where a duration corresponding to the second picture group parameter is less than a duration corresponding to other picture group parameters.

Optionally, the feature determining module 420 is specifically configured to:

if the current video segment is the first video segment, obtain the target feature based on the first video segment encoding data by using a feature extraction policy associated with the second picture group parameter; and if the current video segment is after the first video segment, obtain a feature extraction policy associated with the picture group parameter corresponding to the previous video segment, and obtain the target feature based on the video segment encoding data corresponding to the previous video segment by using the obtained feature extraction policy.

Optionally, the parameter decision module 430 is specifically configured to:

input the target feature into the target decision model associated with the picture group parameter corresponding to the previous video segment, and select a picture group parameter corresponding to the current video segment from at least two picture group parameters according to an output result of the target decision model.

Optionally, the apparatus further includes a model training module, including:

a sequence determining unit, configured to encode the historical video based on at least two picture group parameters respectively to obtain at least two encoding sequence sets corresponding to the historical video, where an encoding sequence set includes video sequence encoding data and video segment encoding data;

a sample set determining unit, configured to: for each picture group parameter, determine a sample feature corresponding to the historical video segment according to the video sequence encoding data corresponding to the picture group parameter, determine a sample tag corresponding to the historical video segment according to the video segment encoding data corresponding to the picture group parameter, and determine a sample set corresponding to the picture group parameter according to the sample feature and the sample tag; and a model training unit, configured to determine at least two decision models to be trained corresponding to the at least two picture group parameters, and training a corresponding decision model to be trained according to the sample set corresponding to each picture coding parameter to obtain at least two decision models.

Optionally, the sequence determining unit is specifically configured to:

for each historical video, encode the historical video based on at least two picture group parameters respectively to obtain at least two video sequence encoding data;

determine a first picture group parameter according to a duration corresponding to the at least two picture group parameters, and segment the historical video according to a duration corresponding to the first picture group parameter to obtain a target data set, where the target data set includes a historical video segment; and for each historical video segment in the target data set, encode the historical video segment based on at least two picture group parameters respectively to obtain at least two video segment encoding data corresponding to the historical video segment.

Optionally, the sample set determining unit is further configured to:

determine an encoding effect corresponding to each picture group parameter according to at least two video segment encoding data corresponding to each historical video segment; and determine the sample tag corresponding to the historical video segment according to the encoding effect corresponding to each picture group parameter.

Optionally, the sample set determining unit is further configured to:

obtain a feature extraction policy associated with the picture group parameter, and obtain, based on the video sequence encoding data by using the feature extraction policy, a target feature corresponding to a current historical video segment as the sample feature of a next historical video segment.

The apparatus for video encoding provided in the embodiments of the present disclosure may perform the video encoding method provided by any embodiment of the present disclosure, and has functional modules and beneficial effects corresponding to executing the method.

It should be noted that the units and modules included in the foregoing apparatus are only divided based on the function logic, but are not limited to the foregoing division, as long as the corresponding functions may be implemented; in addition, the specific names of the functional units are merely for ease of distinguishing, and are not intended to limit the protection scope of the embodiments of the present disclosure.

FIG. 5 is a schematic structural diagram of an electronic device according to an embodiment of the present disclosure. FIG. 5 is a schematic structural diagram of an electronic device 500 (such as the terminal device or server in FIG. 5) suitable for implementing the embodiments of the present disclosure. The terminal device in the embodiments of the present disclosure may include, but is not limited to, a mobile terminal such as a mobile phone, a notebook computer, a digital broadcast receiver, a personal digital assistant (PDA), a tablet computer, a portable multimedia player (PMP), an in-vehicle terminal (for example, an in-vehicle navigation terminal), and a fixed terminal such as a digital TV, a desktop computer, or the like. The electronic device shown in FIG. 5 is merely an example, and should not impose any limitation on the functions and scope of use of the embodiments of the present disclosure.

As shown in FIG. 5, the electronic device 500 may include a processing device (for example, a central processing unit, a graphic processor, etc.) 501, which may perform various appropriate actions and processing based on a program stored in a read-only memory (ROM) 502 or a program loaded into a random-access memory (RAM) 503 from a storage device 508. In the RAM 503, various programs and data required by the operation of the electronic device 500 are also stored. The processing device 501, the ROM 502, and the RAM 503 are connected to each other through a bus 504. An edit/output (I/O) interface 505 is also connected to the bus 504.

Generally, the following devices may be connected to the I/O interface 505: an input device 506 including, for example, a touch screen, a touchpad, a keyboard, a mouse, a camera, a microphone, an accelerometer, a gyroscope, etc.; an output device 507 including, for example, a liquid crystal display (LCD), a speaker, a vibrator, etc.; a storage device 508 including, for example, a magnetic tape, a hard disk, etc.; and a communication device 509. The communication device 509 may allow the electronic device 500 to communicate wirelessly or wired with other devices to exchange data. While FIG. 5 shows an electronic device 500 having various devices, it should be understood that it is not required to implement or have all illustrated devices. More or fewer devices may alternatively be implemented or provided.

In particular, according to an embodiment of the present disclosure, the process described above with reference to the flowchart may be implemented as a computer software program. For example, embodiments of the present disclosure include a computer program product including a computer program embodied on a non-transitory computer readable medium, the computer program including program code for performing the method shown in the flowchart. In such embodiments, the computer program may be downloaded and installed from the network through the communication device 509, or installed from the storage device 508, or from the ROM 502. When the computer program is executed by the processing apparatus 501, the foregoing functions defined in the method of the embodiments of the present disclosure are performed.

The names of messages or information interaction between a plurality of devices in embodiments of the present disclosure are for illustrative purposes only and are not intended to limit the scope of such messages or information.

The electronic device provided in the embodiments of the present disclosure and the video encoding method provided in the foregoing embodiments belong to the same inventive concept, technical details not described in detail in this embodiment may refer to the foregoing embodiments, and this embodiment has the same beneficial effects as the foregoing embodiments.

An embodiment of the present disclosure provides a computer storage medium having a computer program stored thereon, the program, when executed by a processor, performs the video encoding method provided in the foregoing embodiments.

It should be noted that the computer-readable medium described above may be a computer readable signal medium, a computer readable storage medium, or any combination of the foregoing two. The computer-readable storage medium may be, for example, but not limited to, an electrical, magnetic, optical, electromagnetic, infrared, or semiconductor system, device, or device, or any combination thereof. More specific examples of computer-readable storage media may include, but are not limited to, an electrical connection having one or more wires, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination of the foregoing. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted with any suitable medium, including, but not limited to: wires, optical cables, radio frequency (RF), and the like, or any suitable combination of the foregoing.

In some implementations, the client, server may communicate using any currently known or future developed network protocol, such as HyperText Transfer Protocol (HTTP), and may be interconnected with any form or medium of digital data communication (e.g., a communication network). Examples of communication networks include local area networks (LAN), wide area networks (WAN), internets (e.g., the Internet), and peer-to-peer networks (e.g., ad hoc peer-to-peer networks), as well as any currently known or future developed networks.

The computer-readable medium described above may be included in the electronic device; or may be respectively present without being assembled into the electronic device.

The computer-readable medium carries one or more programs, and when the one or more programs are executed by the electronic device, the electronic device is caused to perform the following methods:

determining a video segment included in a target video according to a duration corresponding to a first picture group parameter;

determining a target feature corresponding to video encoding data of a previous video segment for a current video segment;

inputting the target feature into a target decision model, and determining a picture group parameter corresponding to the current video segment by using the target decision model, where the target decision model represents a decision model associated with a picture group parameter corresponding to the previous video segment in at least two decision models, and the at least two decision models are trained based on a sample set generated by encoding a historical video based on at least two picture group parameters; and encoding the current video segment based on the picture group parameter corresponding to the current video segment.

Computer program code for performing the operations of the present disclosure may be written in one or more programming languages, including, but not limited to, object oriented programming languages such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a LAN or a WAN, or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. The name of the unit does not constitute a limitation on the unit itself in some cases.

The functions described above may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system-on-a-chip (SOC), a complex programmable logic device (CPLD), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, portable computer disks, hard disks, RAM, ROM, EPROM or flash memory, optical fibers, CD-ROM, optical storage devices, magnetic storage devices, or any suitable combination of the foregoing.

According to one or more embodiments of the present disclosure, example 1 provides a video encoding method, including:

encoding the current video segment based on the picture group parameter corresponding to the current video segment.

According to one or more embodiments of the present disclosure, example 2 is based on example 1, and includes, after determining the video segment included in the target video according to the duration corresponding to the first picture group parameter:

for a first video segment of the target video, encoding the first video segment based on a second picture group parameter to obtain first video segment encoding data, where a duration corresponding to the second picture group parameter is less than a duration corresponding to other picture group parameters.

According to one or more embodiments of the present disclosure, example 3 is based on example 2, and determining the target feature corresponding to the video encoding data of the previous video segment of the current video segment includes:

if the current video segment is the first video segment, obtaining the target feature based on the first video segment encoding data by using a feature extraction policy associated with the second picture group parameter; and if the current video segment is after the first video segment, obtaining a feature extraction policy associated with the picture group parameter corresponding to the previous video segment, and obtaining the target feature based on the video segment encoding data corresponding to the previous video segment by using the obtained feature extraction policy.

According to one or more embodiments of the present disclosure, example 4 is based on example 3, and inputting the target feature into the target decision model, and determining the picture group parameter corresponding to the current video segment by using the target decision model includes:

inputting the target feature into the target decision model associated with the picture group parameter corresponding to the previous video segment, and selecting a picture group parameter corresponding to the current video segment from at least two picture group parameters according to an output result of the target decision model.

According to one or more embodiments of the present disclosure, example 5 is based on example 1, and training the at least two decision models based on the sample set generated by encoding the historical video based on at least two picture group parameters includes:

encoding the historical video based on at least two picture group parameters respectively to obtain at least two encoding sequence sets corresponding to the historical video, where an encoding sequence set includes video sequence encoding data and video segment encoding data;

for each picture group parameter, determining a sample feature corresponding to the historical video segment according to the video sequence encoding data corresponding to the picture group parameter, determining a sample tag corresponding to the historical video segment according to the video segment encoding data corresponding to the picture group parameter, and determining a sample set corresponding to the picture group parameter according to the sample feature and the sample tag; and determining at least two decision models to be trained corresponding to the at least two picture group parameters, and training a corresponding decision model to be trained according to the sample set corresponding to each picture coding parameter to obtain at least two decision models.

According to one or more embodiments of the present disclosure, example 6 is based on example 5, and encoding the historical video based on at least two picture group parameters respectively to obtain at least two encoding sequence sets corresponding to the historical video includes:

for each historical video, encoding the historical video based on at least two picture group parameters respectively to obtain at least two video sequence encoding data;

determining a first picture group parameter according to a duration corresponding to the at least two picture group parameters, and segmenting the historical video according to a duration corresponding to the first picture group parameter to obtain a target data set, where the target data set includes a historical video segment; and for each historical video segment in the target data set, encoding the historical video segment based on at least two picture group parameters respectively to obtain at least two video segment encoding data corresponding to the historical video segment.

According to one or more embodiments of the present disclosure, example 7 is based on example 6, and determining the sample tag corresponding to the historical video segment according to the video segment encoding data corresponding to the picture group parameter includes:

determining an encoding effect corresponding to each picture group parameter according to at least two video segment encoding data corresponding to each historical video segment; and determining the sample tag corresponding to the historical video segment according to the encoding effect corresponding to each picture group parameter.

According to one or more embodiments of the present disclosure, example 8 is based on example 5, and determining the sample feature corresponding to the historical video segment according to the video sequence encoding data corresponding to the picture group parameter includes:

obtaining a feature extraction policy associated with the picture group parameter, and obtaining, based on the video sequence encoding data by using the feature extraction policy, a target feature corresponding to a current historical video segment as the sample feature of a next historical video segment.

According to one or more embodiments of the present disclosure, an example 9 provides a video encoding apparatus, including:

a video determining module, configured to determine a video segment included in the target video according to a duration corresponding to the first picture group parameter; and a feature determining module, configured to determine a target feature corresponding to the video encoding data of the previous video segment of the current video segment;

a parameter decision module, configured to input the target feature into a target decision model, and determine, by using the target decision model, a picture group parameter corresponding to the current video segment, where the target decision model represents a decision model associated with a picture group parameter corresponding to the previous video segment in at least two decision model, and the at least two decision model are trained based on a sample set generated by encoding historical video based on at least two picture group parameters; and a video encoder module, configured to encode the current video segment based on a picture group parameter corresponding to the current video segment.

According to one or more embodiments of the present disclosure, an example 10 provides an electronic device, including:

one or more processors; and a storage device, configured to store one or more programs;

the one or more programs, when executed by the one or more processors, cause the one or more processors to implement the method of any of examples 1-8.

According to one or more embodiments of the present disclosure, example 11 provides a storage medium including computer-executable instructions that, when executed by a computer processor, are to perform the method of any of examples 1-8.

The above description is merely an illustration of the preferred embodiments of the present disclosure and the principles of the application. It should be understood by those skilled in the art that the present disclosure in the present disclosure is not limited to the technical solutions of the specific combination of the above technical features, and should also cover other technical solutions formed by any combination of the above technical features or their equivalent features without departing from the above disclosed concept. For example, the above features are the technical solutions formed by mutually replacing technical features disclosed in the present disclosure (but not limited to).

Further, while operations are depicted in a particular order, this should not be understood to require that these operations be performed in the particular order shown or in sequential order. In certain circumstances, multitasking and parallel processing may be advantageous. Likewise, while several specific implementation details are included in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A video encoding method, comprising:

determining a video segment comprised in a target video according to a duration corresponding to a first picture group parameter;

determining a target feature corresponding to video encoding data of a previous video segment for a current video segment;

inputting the target feature into a target decision model, and determining a picture group parameter corresponding to the current video segment by using the target decision model, wherein the target decision model represents a decision model associated with a picture group parameter corresponding to the previous video segment in at least two decision models, and the at least two decision models are trained based on a sample set generated by encoding a historical video based on at least two picture group parameters;

encoding the current video segment based on the picture group parameter corresponding to the current video segment.

2. The method of claim 1, wherein after determining the video segment comprised in the target video according to the duration corresponding to the first picture group parameter, the method further comprises:

for a first video segment of the target video, encoding the first video segment based on a second picture group parameter to obtain first video segment encoding data, wherein a duration corresponding to the second picture group parameter is less than a duration corresponding to other picture group parameters.

3. The method of claim 2, wherein determining the target feature corresponding to the video encoding data of the previous video segment of the current video segment comprises:

if the current video segment is the first video segment, obtaining the target feature based on the first video segment encoding data by using a feature extraction policy associated with the second picture group parameter;

if the current video segment is after the first video segment, obtaining a feature extraction policy associated with the picture group parameter corresponding to the previous video segment, and obtaining the target feature based on the video segment encoding data corresponding to the previous video segment by using the obtained feature extraction policy.

4. The method of claim 1, wherein inputting the target feature into the target decision model, and determining the picture group parameter corresponding to the current video segment by using the target decision model comprises:

inputting the target feature into the target decision model associated with the picture group parameter corresponding to the previous video segment, and selecting a picture group parameter corresponding to the current video segment from at least two picture group parameters according to an output result of the target decision model.

5. The method of claim 1, wherein training the at least two decision models based on the sample set generated by encoding the historical video based on at least two picture group parameters comprises:

encoding the historical video based on at least two picture group parameters respectively to obtain at least two encoding sequence sets corresponding to the historical video, wherein an encoding sequence set comprises video sequence encoding data and video segment encoding data;

for each picture group parameter, determining a sample feature corresponding to the historical video segment according to the video sequence encoding data corresponding to the picture group parameter, determining a sample tag corresponding to the historical video segment according to the video segment encoding data corresponding to the picture group parameter, and determining a sample set corresponding to the picture group parameter according to the sample feature and the sample tag;

determining at least two decision models to be trained corresponding to the at least two picture group parameters, and training a corresponding decision model to be trained according to the sample set corresponding to each picture coding parameter to obtain at least two decision models.

6. The method of claim 5, wherein encoding the historical video based on at least two picture group parameters respectively to obtain at least two encoding sequence sets corresponding to the historical video comprises:

for each historical video, encoding the historical video based on at least two picture group parameters respectively to obtain at least two video sequence encoding data;

determining a first picture group parameter according to a duration corresponding to the at least two picture group parameters, and segmenting the historical video according to a duration corresponding to the first picture group parameter to obtain a target data set, wherein the target data set comprises a historical video segment; and for each historical video segment in the target data set, encoding the historical video segment based on at least two picture group parameters respectively to obtain at least two video segment encoding data corresponding to the historical video segment.

7. The method of claim 6, wherein determining the sample tag corresponding to the historical video segment according to the video segment encoding data corresponding to the picture group parameter comprises:

determining an encoding effect corresponding to each picture group parameter according to at least two video segment encoding data corresponding to each historical video segment;

determining the sample tag corresponding to the historical video segment according to the encoding effect corresponding to each picture group parameter.

8. The method of claim 5, wherein determining the sample feature corresponding to the historical video segment according to the video sequence encoding data corresponding to the picture group parameter comprises:

obtaining a feature extraction policy associated with the picture group parameter, and obtaining, based on the video sequence encoding data by using the feature extraction policy, a target feature corresponding to a current historical video segment as the sample feature of a next historical video segment.

9. An electronic device, comprising:

one or more processors;

a storage device, configured to store one or more programs;

the one or more programs, when executed by the one or more processors, cause the one or more processors to implement the acts comprising:

determining a video segment comprised in a target video according to a duration corresponding to a first picture group parameter;

determining a target feature corresponding to video encoding data of a previous video segment for a current video segment;

inputting the target feature into a target decision model, and determining a picture group parameter corresponding to the current video segment by using the target decision model, wherein the target decision model represents a decision model associated with a picture group parameter corresponding to the previous video segment in at least two decision models, and the at least two decision models are trained based on a sample set generated by encoding a historical video based on at least two picture group parameters;

encoding the current video segment based on the picture group parameter corresponding to the current video segment.

10. The electronic device of claim 9, wherein after determining the video segment comprised in the target video according to the duration corresponding to the first picture group parameter, the method further comprises:

for a first video segment of the target video, encoding the first video segment based on a second picture group parameter to obtain first video segment encoding data, wherein a duration corresponding to the second picture group parameter is less than a duration corresponding to other picture group parameters.

11. The electronic device of claim 10, wherein determining the target feature corresponding to the video encoding data of the previous video segment of the current video segment comprises:

if the current video segment is the first video segment, obtaining the target feature based on the first video segment encoding data by using a feature extraction policy associated with the second picture group parameter;

if the current video segment is after the first video segment, obtaining a feature extraction policy associated with the picture group parameter corresponding to the previous video segment, and obtaining the target feature based on the video segment encoding data corresponding to the previous video segment by using the obtained feature extraction policy.

12. The electronic device of claim 9, wherein inputting the target feature into the target decision model, and determining the picture group parameter corresponding to the current video segment by using the target decision model comprises:

inputting the target feature into the target decision model associated with the picture group parameter corresponding to the previous video segment, and selecting a picture group parameter corresponding to the current video segment from at least two picture group parameters according to an output result of the target decision model.

13. The electronic device of claim 9, wherein training the at least two decision models based on the sample set generated by encoding the historical video based on at least two picture group parameters comprises:

encoding the historical video based on at least two picture group parameters respectively to obtain at least two encoding sequence sets corresponding to the historical video, wherein an encoding sequence set comprises video sequence encoding data and video segment encoding data;

for each picture group parameter, determining a sample feature corresponding to the historical video segment according to the video sequence encoding data corresponding to the picture group parameter, determining a sample tag corresponding to the historical video segment according to the video segment encoding data corresponding to the picture group parameter, and determining a sample set corresponding to the picture group parameter according to the sample feature and the sample tag;

determining at least two decision models to be trained corresponding to the at least two picture group parameters, and training a corresponding decision model to be trained according to the sample set corresponding to each picture coding parameter to obtain at least two decision models.

14. The electronic device of claim 13, wherein encoding the historical video based on at least two picture group parameters respectively to obtain at least two encoding sequence sets corresponding to the historical video comprises:

for each historical video, encoding the historical video based on at least two picture group parameters respectively to obtain at least two video sequence encoding data;

determining a first picture group parameter according to a duration corresponding to the at least two picture group parameters, and segmenting the historical video according to a duration corresponding to the first picture group parameter to obtain a target data set, wherein the target data set comprises a historical video segment; and for each historical video segment in the target data set, encoding the historical video segment based on at least two picture group parameters respectively to obtain at least two video segment encoding data corresponding to the historical video segment.

15. The electronic device of claim 14, wherein determining the sample tag corresponding to the historical video segment according to the video segment encoding data corresponding to the picture group parameter comprises:

determining an encoding effect corresponding to each picture group parameter according to at least two video segment encoding data corresponding to each historical video segment;

determining the sample tag corresponding to the historical video segment according to the encoding effect corresponding to each picture group parameter.

16. The electronic device of claim 13, wherein determining the sample feature corresponding to the historical video segment according to the video sequence encoding data corresponding to the picture group parameter comprises:

obtaining a feature extraction policy associated with the picture group parameter, and obtaining, based on the video sequence encoding data by using the feature extraction policy, a target feature corresponding to a current historical video segment as the sample feature of a next historical video segment.

17. A non-transitory storage medium comprising computer-executable instructions, wherein the computer-executable instructions, when executed by a computer processor, are configured to implement the acts comprising:

determining a video segment comprised in a target video according to a duration corresponding to a first picture group parameter;

determining a target feature corresponding to video encoding data of a previous video segment for a current video segment;

inputting the target feature into a target decision model, and determining a picture group parameter corresponding to the current video segment by using the target decision model, wherein the target decision model represents a decision model associated with a picture group parameter corresponding to the previous video segment in at least two decision models, and the at least two decision models are trained based on a sample set generated by encoding a historical video based on at least two picture group parameters;

encoding the current video segment based on the picture group parameter corresponding to the current video segment.

18. The non-transitory storage medium of claim 17, wherein after determining the video segment comprised in the target video according to the duration corresponding to the first picture group parameter, the method further comprises:

for a first video segment of the target video, encoding the first video segment based on a second picture group parameter to obtain first video segment encoding data, wherein a duration corresponding to the second picture group parameter is less than a duration corresponding to other picture group parameters.

19. The non-transitory storage medium of claim 18, wherein determining the target feature corresponding to the video encoding data of the previous video segment of the current video segment comprises:

if the current video segment is the first video segment, obtaining the target feature based on the first video segment encoding data by using a feature extraction policy associated with the second picture group parameter;

if the current video segment is after the first video segment, obtaining a feature extraction policy associated with the picture group parameter corresponding to the previous video segment, and obtaining the target feature based on the video segment encoding data corresponding to the previous video segment by using the obtained feature extraction policy.

20. The non-transitory storage medium of claim 17, wherein inputting the target feature into the target decision model, and determining the picture group parameter corresponding to the current video segment by using the target decision model comprises:

inputting the target feature into the target decision model associated with the picture group parameter corresponding to the previous video segment, and selecting a picture group parameter corresponding to the current video segment from at least two picture group parameters according to an output result of the target decision model.

* * * * *